US012650981B1

(12) United States Patent
Gurram et al.

(10) Patent No.: US 12,650,981 B1
(45) Date of Patent: Jun. 9, 2026

(54) INCREMENTAL CACHING ON TIME SERIES ANALYTICS

(71) Applicant: ServiceNow, Inc., Santa Clara, CA (US)

(72) Inventors: Nitin Gurram, Hyderabad (IN); Pratik Sengupta, Hyderabad (IN); Manoj Chaitanya Daggubati, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 19/042,347

(22) Filed: Jan. 31, 2025

(51) Int. Cl.
G06F 16/2453 (2019.01)
G06F 16/2455 (2019.01)

(52) U.S. Cl.
CPC .... G06F 16/24534 (2019.01); G06F 16/2456 (2019.01)

(58) Field of Classification Search
CPC ..................... G06F 16/24534; G06F 16/2456
USPC ......................................... 707/713
See application file for complete search history.

(56) References Cited

U.S. PATENT DOCUMENTS

| | | | |
|---|---|---|---|
| 11,132,743 B2 | 9/2021 | Parker | |
| 11,442,924 B2 | 9/2022 | Miller et al. | |
| 12,056,120 B2 | 8/2024 | Luo et al. | |
| 12,131,233 B1 | 10/2024 | Kulkarni et al. | |
| 2003/0169284 A1 | 9/2003 | Dettinger et al. | |
| 2007/0025351 A1 | 2/2007 | Cohen | |

| | | | |
|---|---|---|---|
| 2008/0133570 A1* | 6/2008 | Allen | G06F 16/2428 707/999.102 |
| 2011/0264637 A1* | 10/2011 | Peled | G06F 7/02 726/1 |
| 2015/0363464 A1* | 12/2015 | Alves | G06F 16/903 707/765 |
| 2016/0224676 A1 | 8/2016 | Miller et al. | |
| 2019/0243832 A1* | 8/2019 | Natvig | G06F 16/2255 |
| 2021/0342125 A1* | 11/2021 | Burnett | G06F 8/34 |
| 2022/0004555 A1* | 1/2022 | Kumar | G06F 11/3452 |
| 2024/0303236 A1 | 9/2024 | Andreev et al. | |
| 2025/0225135 A1* | 7/2025 | Bhattacharjee | G06F 16/90335 |

OTHER PUBLICATIONS

Namiot, Dmitry, "Time Series Databases", DAMDID/RCDL 2015, Obninsk, Russia, Oct. 13-16, 2015, pp. 132-137.

(Continued)

*Primary Examiner* — Cam Y T Truong
(74) *Attorney, Agent, or Firm* — Novak Druce Carroll LLP

(57) ABSTRACT

Aspects of the subject technology relate to systems, methods, and computer-readable media for dynamically accessing cached data based on a subset of data points associated with a query and partially retrieving data from a primary data source for the remaining data points. An example method can include receiving a user query, which requests data associated with a time range comprising a plurality of data points indexed in time order. The example method can include accessing cached data from a cache memory and retrieving, from the cache memory, a first set of data associated with a first subset of the plurality of data points. The example method can further include accessing a database, and retrieving, from the database, a second set of data associated with a second subset of the plurality of data points.

14 Claims, 6 Drawing Sheets

(56) References Cited

OTHER PUBLICATIONS

Kang, Rui, et al., "Optimizing Time Series Queries with Versions", Proc. of the ACM on Management of Data, vol. 2, Issue 3, Article No. 159, Jun. 2024, pp. 1-27.
Bitincka, Ledion, et al., "Optimizing Data Analysis with a Semi-structured Time Series Database", SLAML '10, Vancouver, British Columbia, Canada, Oct. 3, 2010, pp. 1-9.

* cited by examiner

400

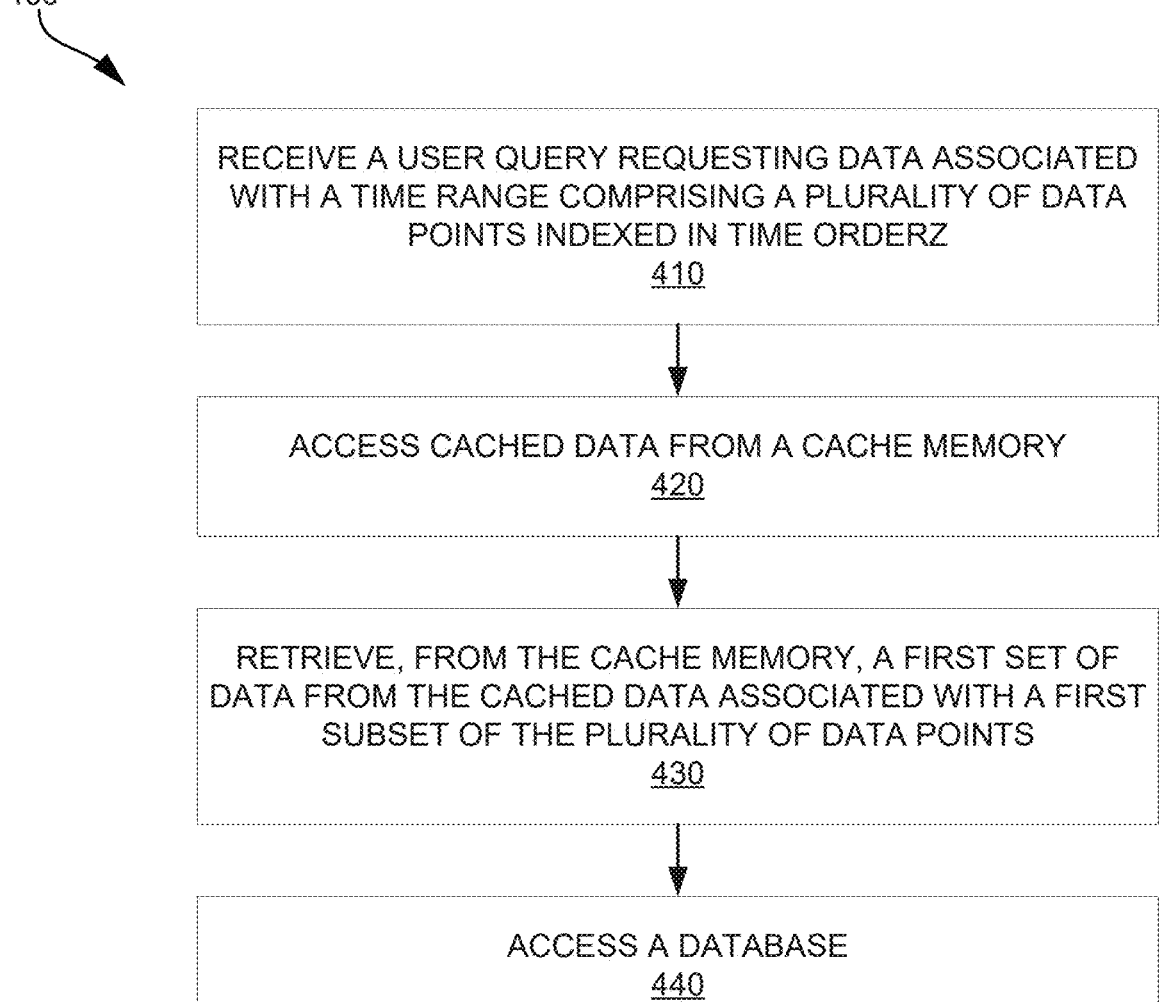

RECEIVE A USER QUERY REQUESTING DATA ASSOCIATED
WITH A TIME RANGE COMPRISING A PLURALITY OF DATA
POINTS INDEXED IN TIME ORDERZ
410

ACCESS CACHED DATA FROM A CACHE MEMORY
420

RETRIEVE, FROM THE CACHE MEMORY, A FIRST SET OF
DATA FROM THE CACHED DATA ASSOCIATED WITH A FIRST
SUBSET OF THE PLURALITY OF DATA POINTS
430

ACCESS A DATABASE
440

RETRIEVE, FROM THE DATABASE, A SECOND SET OF A
DATA ASSOCIATED WITH A SECOND SUBSET OF THE
PLURALITY OF DATA POINTS
450

FIG. 4

INCREMENTAL CACHING ON TIME SERIES ANALYTICS

BACKGROUND

1. Technical Field

The present disclosure generally relates to data caching, and more specifically to dynamically accessing cached data based on a subset of data points associated with a query and partially retrieving data from a primary data source for the remaining data points.

2. Introduction

A caching system is a mechanism that stores frequently accessed data in a temporary storage location (called a cache) for quick access. For example, if the requested data exists in the cache, the data can be retrieved directly, bypassing the primary source such as databases, Application Programming Interfaces (APIs), or disk storage. The caching system can help reduce latency, enhance performance, and minimize the workload on the primary data source.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 4 illustrates a flowchart of an example method of dynamically accessing cached data based on a subset of data points associated with a query and partially retrieving data from a primary data source for the remaining data points, according to some examples of the present disclosure.

DETAILED DESCRIPTION

Figure 1A:
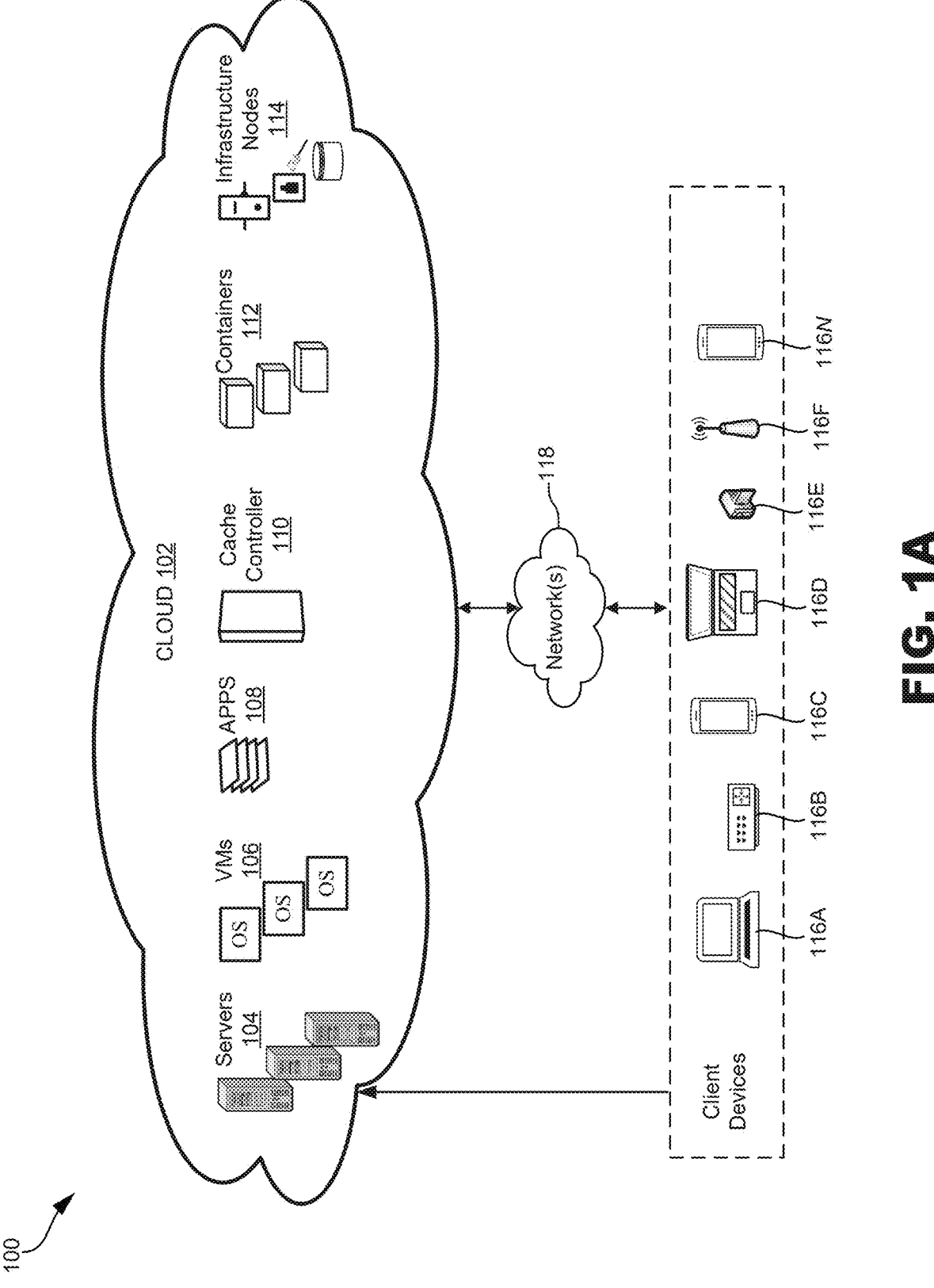
FIG. 1A illustrates a diagram of an example cloud computing architecture, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

As discussed previously, a caching system is a mechanism that stores frequently accessed data in a temporary storage location (called a cache) for quick access. For example, if the requested data exists in the cache, the data can be retrieved directly, bypassing the primary source such as databases, Application Programming Interfaces (APIs), or disk storage. The caching system can help reduce latency, enhance performance, and minimize the workload on the primary data source.

However, cache memory is expensive and limited and must be maintained such that relevant data is stored in the cache. To help manage cache memory, a system may periodically capture cached query results as materialized views. However, materialized views need to be refreshed to stay consistent with the underlying data, and, therefore, they may require enormous computational resources and manual scheduling or automatic triggers to maintain. Incremental refresh can be used to update the parts of a materialized view that have changed. While incremental refresh may make the refresh process faster, it relies on accurate identification of changes in the underlying data and updates only tracked changes.

The disclosed technology addresses the foregoing by dynamically accessing cached data based on a subset of data points associated with a query and partially retrieving data from a primary data source for the remaining data points. For example, the disclosed technology can identify a portion of cached data that has overlapping data points and fetch, from a database, data for missing data points. As follows, the disclosed technology can incrementally cache aggregated query results for time series data (e.g., data points that are indexed in time order). Further, the cached results can be reused for subsequent queries that may have overlapping date ranges. The use of partial data based on cached results can significantly reduce the need for full-range queries in time series analysis, thereby improving the efficiency of storage and retrieval of query results. Also, without the resource-intensive precomputation, the disclosed technology can optimize resource use and avoid redundant database calls.

Furthermore, the disclosed technology can provide solutions for improving the efficiency of a caching system by generating unique identifiers (e.g., hash codes) for a query that includes multiple logical conditions. For example, a query with a plurality of logical conditions (e.g., OR, AND, etc.) can be rewritten by generating a unique identifier for different orders or arrangements of the logical conditions, thereby optimizing query results and improving the efficiency of caching.

FIG. 1A illustrates a diagram of an example cloud computing environment 100 that can be used to implement a data caching system, according to some examples of the present disclosure. The cloud computing environment 100 can include and/or represent a cloud 102. The cloud 102 can include one or more private clouds, public clouds, and/or hybrid clouds. Moreover, the cloud 102 can include cloud elements 104-114. The cloud elements 104-114 can include or represent, for example, servers 104, virtual machines (VMs) 106, applications or services 108, cache controller 110, software containers 112, and/or infrastructure nodes 114. The infrastructure nodes 114 can include various types of nodes, such as compute nodes, storage nodes, network nodes, management systems, etc.

The cloud 102 can provide cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client devices 116A-N (collectively referred to as "client devices 116" hereinafter) can connect with the cloud 102 to obtain one or more specific services from the cloud 102. The client devices 116 can connect with the cloud 102 from any network of the client devices 116 such as a local area network (wired and/or wireless), a cellular network, and/or any other network, and using the network(s) 118 to transport communications between the cloud 102 and the client devices 116. For example, the client devices 116 can communicate with the cloud 102 and/or any of the elements 104-114 via a network(s) 118. The network(s) 118 can include one or more public networks (e.g., the Internet, a wide area network, etc.), one or more private networks (e.g., local area network(s), wireless local area network(s), private backbone network(s), etc.), and/or one or more hybrid networks (e.g., virtual private network(s), public and private cloud network(s), etc.).

The client devices 116 can include any device with networking capabilities, such as a laptop computer, a tablet computer, a server, a desktop computer, a smartphone, a network device (e.g., an access point, a router, a switch, etc.), a smart television, a smart car, a sensor system, a gaming console, a smart wearable device (e.g., smartwatch, etc.), an internet of things (IoT) device, a camera, a network printer, or any other computing device.

Figure 1B:
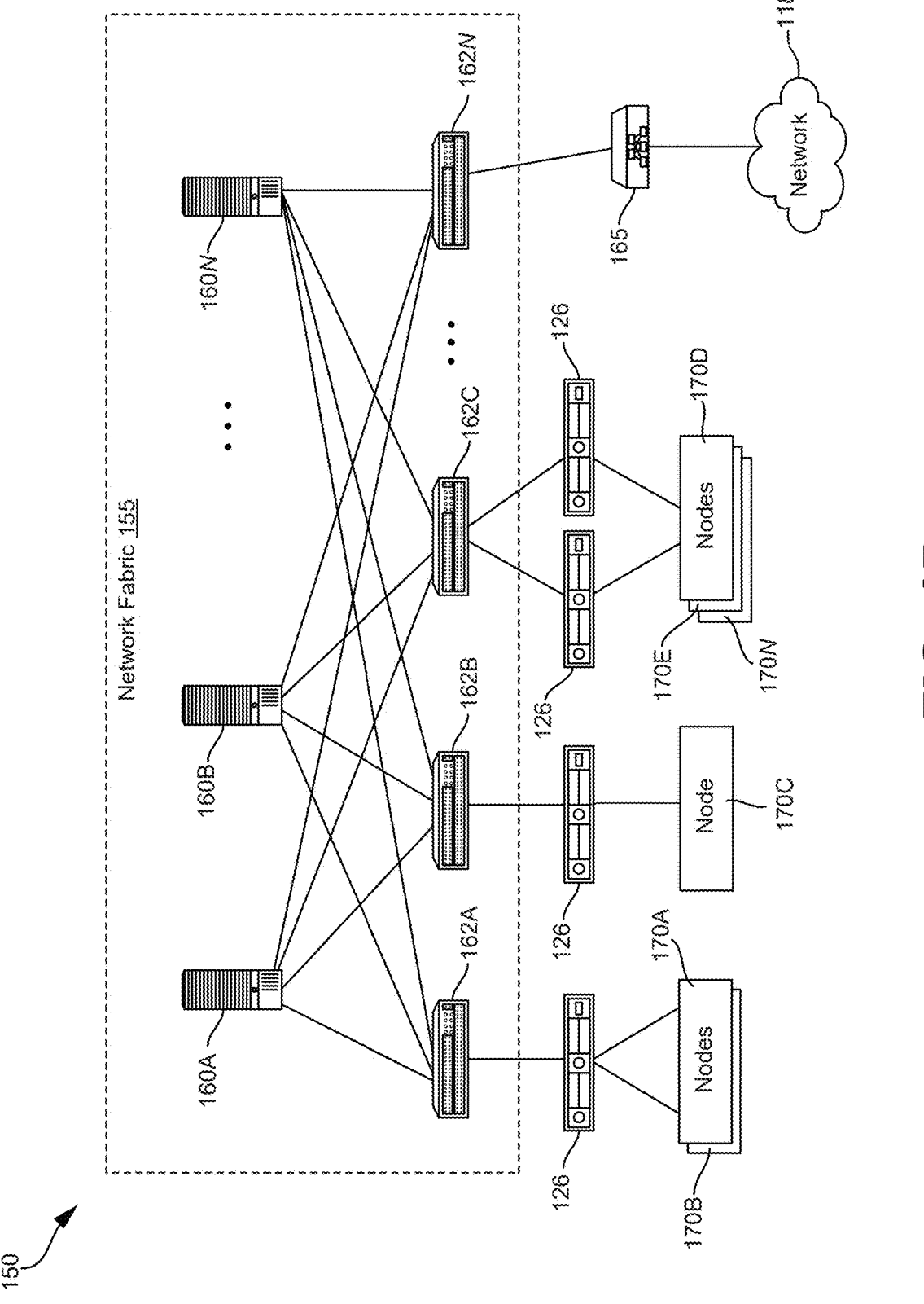
FIG. 1B is a block diagram illustrating an example network architecture that can be used to implement one or more aspects, components, devices, nodes, systems, instances, and/or portions of the example cloud computing architecture, according to some examples of the present disclosure.

In some examples, the cloud 102 can implement cache controller 110 associated with one or more entities. An example network architecture that can be used to implement a network or datacenter (or any portion thereof), such as the cloud 102, is shown in FIG. 1B and further described below. In some cases, one or more services, components, devices, nodes, systems, instances, and/or portions of the example network architecture 150 shown in FIG. 1B can be implemented by and/or in a cloud network or datacenter, such as the cloud 102.

FIG. 1B is a block diagram illustrating an example network architecture 150 that can be used to implement one or more portions of the example cloud computing environment 100, according to some examples of the present disclosure. The example network architecture 150 in FIG. 1B can represent, implement, deploy, host, support, include and/or provide the infrastructure for (or a portion of the infrastructure for) a datacenter (e.g., a cloud datacenter, an on-premises datacenter, a hybrid datacenter including private and public datacenters or datacenter portions, etc.), a network infrastructure, and/or any network environment (or portion thereof) such as, for example and without limitation, a cloud network/environment, a campus network/environment, an enterprise network/environment, an on-premises network/environment, a private network/environment, a public network/environment, a hybrid network/environment (e.g., a network/environment including both private and public networks/environments or portions thereof), and/or the like.

In some examples, the example network architecture 150 can host, implement, deploy, provide (e.g., provide the infrastructure for or a portion of the infrastructure for), support, and/or run/execute one or more applications, virtual machines (VMs), software containers, software tools, software functions, software algorithms, software models (e.g., artificial intelligence and machine learning models, software models implementing one or more classical algorithms, etc.), software applications, software packages, domains, databases, networks, services, workloads, service chains, functions, controllers, virtual network functions (VNFs), servers, drivers, hardware and/or software resources, software and/or hardware devices, software and/or hardware nodes, networking elements, serverless environments, serverless functions, cloud services and/or applications (e.g., software-as-a-service, function-as-a-service, infrastructure-as-a-service, platform-as-a-service, cloud applications, and/or any other cloud services and/or applications), execution environments, storage systems, processing/compute systems, memory systems, software and/or network sites, software policies, virtual/logical networks, overlay networks, software-defined networks (SDNs), interfaces, and/or any other code, component, element, application, service, etc.

For example, the network architecture 150 can include, represent, implement, support, run, host, and/or provide the infrastructure for (or a portion of the infrastructure for) a datacenter, network (e.g., a cloud or cloud network, an on-premises network, a private network, a public network, a hybrid network, etc.), network infrastructure, and/or network environment used to host, implement, support, deploy, provide, and/or run workloads/nodes. In some cases, a cloud node can implement, include, represent, support, run, host, and/or provide one or more software applications/services, software systems, software packages, software modules, software units, software tools, interfaces, software/application code, functions, virtual environments, virtual applications, execution environments, virtualization elements (e.g., operating system-level virtualization elements, application-level virtualization elements, etc.), platforms, and/or any other components. In some cases, the node can host and run one or more software containers, VMs, VNFs, applications (e.g., container applications, VM applications, and/or any other software applications), operating systems (OSs), functions, tools, and/or any other execution environment, code, tool, component, element, and/or package.

As shown in FIG. 1B, the network architecture 150 can include a network fabric 155. The network fabric 155 can include and/or represent the physical layer (e.g., underlay) and/or infrastructure of the network architecture 150. In some cases, the network fabric 155 can represent a data center(s) of one or more networks such as, for example, the cloud 102. The network fabric 155 can include network devices 160A-N (collectively referred to as "network devices 160" hereinafter) and network devices 162A-N (collectively referred to as "network devices 162" hereinafter), which are interconnected to route, relay, forward, and/or switch traffic in the network fabric 155. In some examples, the network devices 160 and the network devices 162 can include, implement, represent, and/or operate as switches (e.g., Layer 2 and/or Layer 3 switches, aggregation switches, ingress and/or egress switches, top-of-rack (ToR) switches, core switches, spine switches, leaf switches, etc.), routers, hubs, bridges, gateways, provider edge devices, firewalls, network controllers, and/or any other type of networking devices. In FIG. 1B, the network fabric 155 includes or implements a spine-leaf topology. In such examples, the network devices 160 can represent spine nodes (e.g., spine switches or routers) and the network devices 162 can represent leaf nodes (e.g., leaf switches or routers). In other examples, the network fabric 155 can alternatively or additionally include or implement any other network topology.

The network devices 160 are interconnected with the network devices 162, and the network devices 162 can connect the network 118, the system servers 126, the network device 165, and/or the nodes 170A-N (collectively referred to as "nodes 170" hereinafter) with any portion of the network fabric 155 (e.g., including each other). In some cases, the network fabric 155 can include, host, and/or implement a network overlay(s) or logical network(s) that includes or implements one or more application services, servers, VMs, software containers, virtual resources (e.g., storage, memory, processors, network interfaces, virtual tools, execution environments, etc.), workloads, functions, virtual networks, hardware and/or software resources, and/or any other element(s).

Network connectivity in the network fabric 155 can flow from the network devices 160 to the network devices 162, and vice versa. The network devices 162 can route, switch, relay, forward, and/or bridge network traffic to and from other portions of the network fabric 155, other networks, e.g., network 118, various network elements, the network device 165, the nodes 170, external client devices (e.g., clients devices external to the network fabric 155), data centers, clouds, tunnels, software-defined networks (SDNs) and/or SDN branches, on-premises networks, cloud tenants, cloud customers, applications, and/or any other network element. Thus, the network devices 162 can connect networks and network elements of the network fabric 155 with each other and with other networks and network elements.

In FIG. 1B, the system servers 126 can include or represent computer servers. Each of the system servers 126 can host, include, implement, and/or run one or more applications, functions, services, VMs, software containers, service chains, workloads, AI/ML models, algorithms, resources, cloud appliances, and/or any other software. For example, the system servers 126 can implement any of the applications 108 hosted on the cloud 102. In some cases, the system servers 126 connected to the network devices 162 can encapsulate and decapsulate packets to and from the network devices 162. For example, the system servers 126 can include, host, implement and/or operate one or more virtual routers, switches, gateways, endpoints, and/or network devices for tunneling packets between an overlay or logical layer hosted by, or connected to, the system servers 126 and an underlay layer represented by or included in the network fabric 155.

As shown in FIG. 1B, the system servers 126 can host, include, run, operate, and/or implement the nodes 170. In some examples, the nodes 170 can represent cloud instances. For example, in some cases, the nodes 170 can each represent a virtual server and/or environment (e.g., a VM, a software container, etc.) that uses compute, memory, storage, and/or networking resources on the cloud (e.g., network architecture 150) for respective workloads. For example, the nodes 170 can implement any of the applications 108 hosted on the cloud 102. In some implementations, the nodes 170 can perform parallel computing using, for example, multithreading. Each of the nodes 170 can include, host, implement, run, operate, and/or represent one or more server applications, software containers, VMs, software, services, AI/ML models, algorithms, cloud appliances, software functions, service chains, workloads, server-side functions, processing resources, computers, and/or any other software and/or hardware component.

For example, in some cases, each of the nodes 170 can represent a node instance that includes, implements, hosts, and/or runs a software container(s), an application(s), and/or a data augmentation system(s). In some examples, a software container(s) associated with a node can provide, run, deploy, include, operate, represent, and/or implement an execution environment(s), a workload(s), an application(s), software, an AI/ML model(s), an algorithm(s), a driver(s), a computer service(s), a software model(s) and/or algorithm(s), a function(s), a software library/libraries, a software tool(s), a software/cloud appliance(s), a software component(s), and/or any other computing element(s). In some cases, the nodes 170 can represent cloud node instances running respective computing environments, such as software containers or VMs. Each VM can include software, services, drivers, applications, libraries, functions, virtualized resources (e.g., processors, memory, storage, network interfaces, etc.), and/or workloads installed, implemented, included, and/or running/executed on a guest operating system (OS) associated with the VM.

The network architecture 150 can deploy, run, implement, host, and/or support various resources (e.g., hosts, applications, services, functions, VMs, software containers, workloads, cloud appliances, service chains, hardware and/or software resources, AI/ML models, algorithms, application platforms, operating systems, etc.) using the system servers 126, the network fabric 155, the network devices 160, the network devices 162, the network device 165, the nodes 170, and/or the network 118.

In some cases, the network architecture 150 can implement and/or can be part of one or more cloud networks and can provide one or more cloud computing services such as, for example and without limitation, cloud storage, serverless computing, software-as-a-service (SaaS) (e.g., streaming services, content delivery services, video services, Internet content services, application services, conferencing services, etc.), infrastructure-as-a-service (IaaS), platform-as-a-service (PaaS) (e.g., web services, streaming services, content delivery services, content library services, conferencing services, video services, Internet content services, sharing and/or collaboration services, etc.), function-as-a-service (FaaS), and/or any other types of services such as desktop-as-a-service (DaaS), information technology management-as-a-service (ITaaS), managed software-as-a-service (MSaaS), mobile backend-as-a-service (MBaaS), etc.

The network architecture 150 described above illustrates a non-limiting example network architecture provided herein for explanation purposes. It should be noted that other network architectures can be implemented in other examples and are also contemplated herein. One of ordinary skill in the relevant art(s) will recognize in view of the disclosure that other network architectures can be used to implement one or more of the concepts, systems, techniques, devices, software, applications, methods, embodiments, elements, examples, and/or components disclosed herein.

An enterprise network associated with an entity can be implemented through the cloud computing environment 100 shown in FIG. 1A and the network architecture 150 shown in FIG. 1B. For example, data caching system or cache controller 110 for incrementally caching for time series data can be implemented through the cloud computing environment and/or the network architecture 150.

Figure 2:
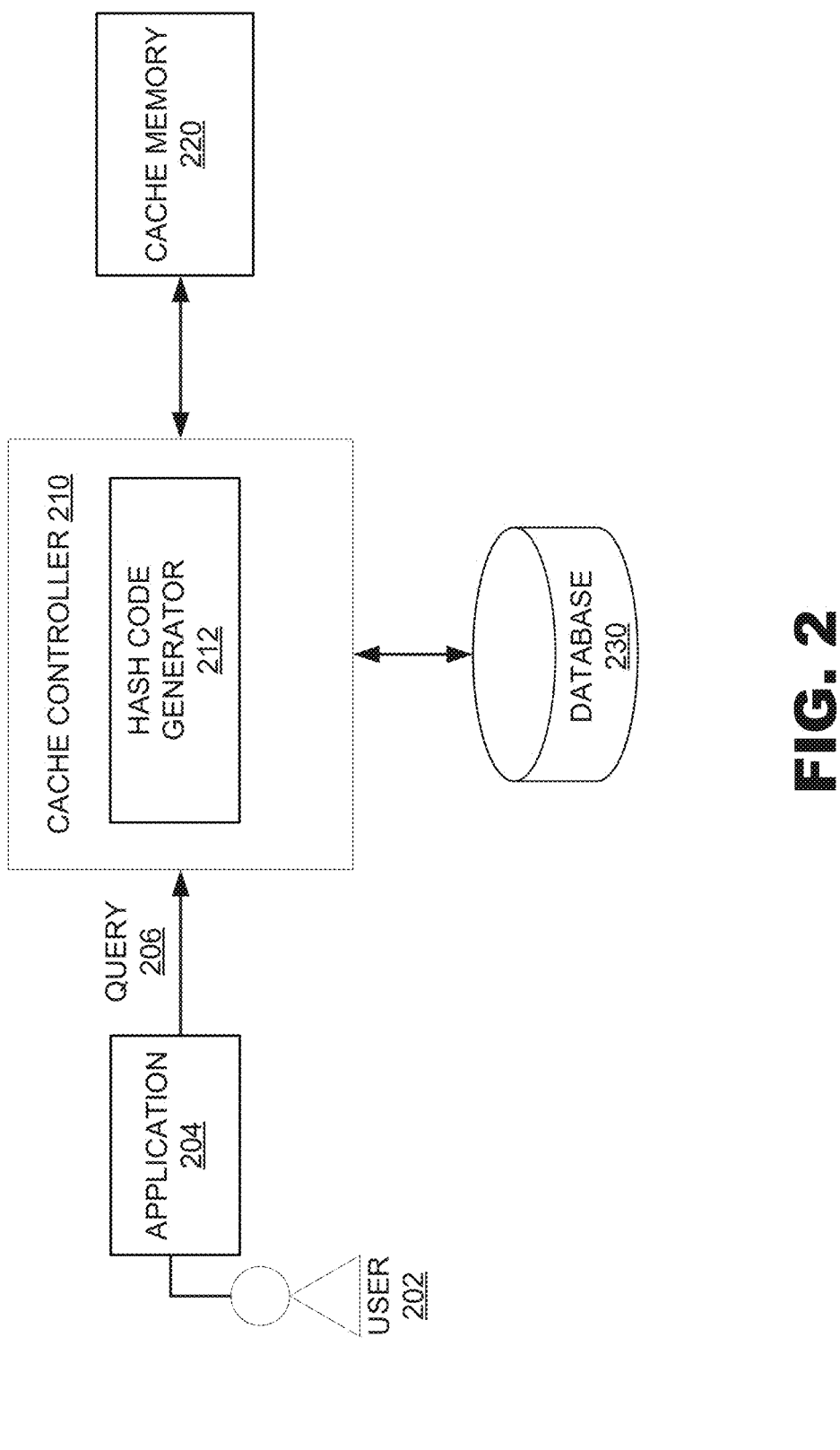
FIG. 2 is a diagram illustrating an example system process for dynamically accessing cached data and partially retrieving data from a primary data source, according to some examples of the present disclosure.

FIG. 2 illustrates an example system process 200 for dynamically accessing cached data and partially retrieving data from a primary data source. In this example, cache controller 210 (similar to cache controller 110 as illustrated in FIG. 1) may receive query 206 from application 204 and access cache memory 220 and database 230 in order to generate a response to query 206. For example, user 202 can use a client device (e.g., client device(s) 116A-116N) to provide query 206, which includes an analytical question or a data request. The cache controller 210 can access cache memory 220 and/or database 230 to fetch pertinent data to generate a response to query 206.

In some examples, query 206 may include a request for data captured in a time range (e.g., time-series data). For example, query 206 may request data associated with a time range, which comprises a plurality of data points indexed in time order (e.g., daily, weekly, monthly, annually, etc.). In some cases, query 206 may include an analytical query for time-series data, which inquires about an analysis of data points collected or recorded at specific time intervals such as sales revenue in January, tickets resolved in Q1, and so on. In some examples, query 206 may include a data request referencing a user-defined or customized time range or duration. For example, user 202 may request, via query 206, inventory-level records for every Monday in February.

The cache controller 210 is configured to copy data or code from main memory (e.g., database 230) to cache memory (e.g., cache memory 220) and store a subset of data (e.g., frequently or recently accessed data) to reduce the latency of data retrieval. The cache memory 220 stores data closer to where it is needed (e.g., application 204, CPU (not shown), etc.) and enables faster access to data compared to fetching it from original storage location or primary data source (e.g., database 230, main memory, disk storage, etc.). For example, query results or indexes can be cached or stored in cache memory 220 to reduce query response times. Further, cache controller 210 is configured to check if requested data is present in the cache memory 220 or needs to be fetched from database 230.

In some implementations, database 230 is configured to store time-series data, which comprises a sequence of data points that are associated with successive points in time. For example, database 230 stores time-series data captured or recorded over time, which includes data points or values for various metrics (e.g., performance measurements from a computer system, incident resolution and closure, etc.).

In some implementations, cache controller 210 is configured to determine whether cached data in cache memory 220 includes at least a subset of the time range specified or referenced in query 206. For example, cache controller 210 may identify temporal boundaries of the time range based on query 206 and identify the plurality of data points within temporal boundaries. The cache controller 210 compares the plurality of data points with data points stored in cache memory 220 to determine whether there are overlapping data points.

In some examples, cache controller 210 can fill cache at a calendar monthly level. Specifically, cache may be filled consecutively, and missing data points are at the end for a given month. For example, for past months, cache can be either entirely filled or empty, except when data retention is triggered for older data. For the present month, cache is filled to the present date. So, any cache-missing scenario would require the cache to be filled from the last filled data point to the present-day data point. To illustrate an example, assume today is Jan. 1, 2025 and query 206 may request a score for December 5 and 6, 2024. The cache controller 210 would fill the entire December month's cache. In another example, assume today is Jan. 22, 2025 and cache is filled till Jan. 10, 2025. A user requested query 206 for a score for January 20 and 21, 2025. The cache controller 210 will fill cache from last-filled date of the month to the present day, i.e., January 11 to Jan. 22, 2025.

In response to identifying overlapping data points, cache controller 210 may fetch those overlapping data points from cache memory 220 and retrieve the remaining data points from database 230 to fill. For example, a first user has fetched data associated with the first two weeks of January, ranging from January 1 to Jan. 14, 2025. The cache controller 210 stores the data points corresponding to the first two weeks of January in cache memory 220. Subsequently, a second user has fetched data associated with the last two weeks of January, ranging from January 26 to Jan. 31, 2025. The cache controller 210 then stores the data points corresponding to the last two weeks of January in cache memory 220. When a third user requests data for the month of January, ranging from January 1 to Jan. 31, 2025, cache controller 210 may reuse the data points corresponding to January 1st to January 14th and January 26th to January 31$^{st}$ instead of retrieving data for the entire month range from database 230. The cache controller 210 may fetch the missing data points corresponding to January 15$^{th}$ to January 25$^{th}$ and stitch them along with the ones obtained from cache memory 220.

The cache controller 210 may dynamically retrieve data from cache memory 220 and database 230, enabling access-based data retrieval without a need for pre-computation. For example, cache controller 210 fills the data points when they are accessed, and does not pre-populate every cache. The cache controller 210 calculates only the missing data points and the rest can be handled by stitching. As previously described, upon determining that new data points have been accessed, cache controller 210 can inject the new data points to cache data for a subsequent use.

In some examples, cache controller 210 may implement hash code generator 212, which is configured to rewrite a query 206 using a hashing code. For example, hash code generator 212 may identify multiple logical conditions specified in query 206. The hash code generator 212 may determine whether the logic is the same, regardless of the order of logical conditions specified in query 206, for example, A or B or C, A or C or B, B or A or C, B or C or B, C or A or B, or C or B or A. Specifically, hash code generator 212 can generate the same hash for different condition orders as shown in Table 1. In another example, "conditionA=Test AND condition B=Something Else" will have the same hash code generated as "condition B=Something Else AND conditionA=Test."

TABLE 1

| id | filter | filter_hash |
|---|---|---|
| 1 | /39/categoryINsoftware,hardware^ORopened_atON2023-08-02@javascript:gs.dateGenerate('2023-08-02','start')@javascript:gs.dateGenerate('2023-08-02','end')/standard/DAILY/SUM/reassignment_count | 1234 |
| 2 | /39/categoryINsoftware/business_calendar_sys_id/span/COUNT/* | 4567 |
| 3 | SRC/11/categoryINsoftware/business_calendar_sys_id/span/COUNT/* | 6789 |

Figure 3:
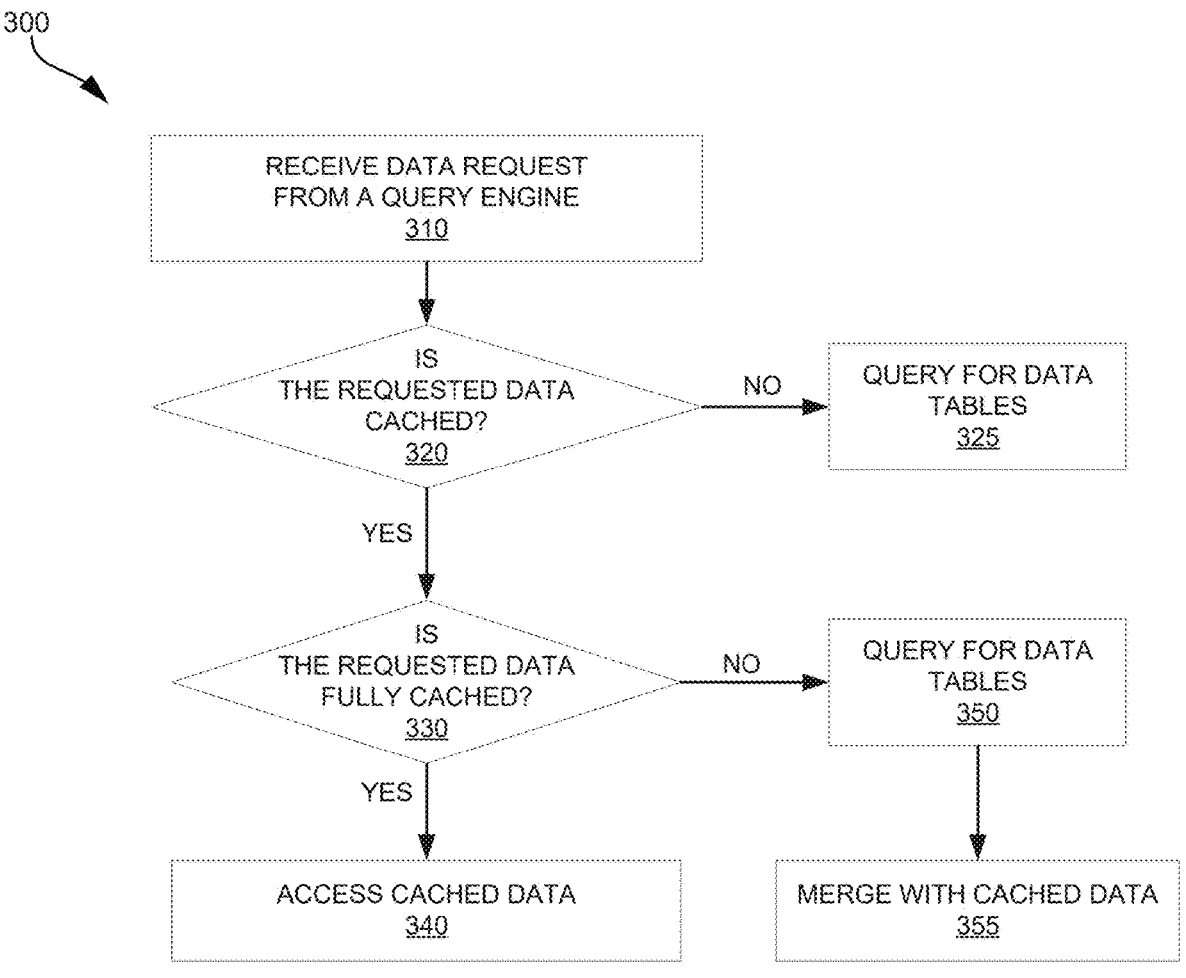
FIG. 3 illustrates a flow chart of an example method of incrementally caching time-series data, according to some examples of the present disclosure.

FIG. 3 illustrates a flow chart of an example method 300 of incrementally caching time-series data, according to some examples of the present disclosure. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 400 shall be described with reference to FIG. 2. However, method 400 is not limited to that example.

At step 310, cache controller 210 may receive a request for time series data (e.g., query 206) from a query engine. For example, cache controller 210 may receive a request for data referencing a specific time range such as tickets issued in December 2024.

At step 320, cache controller 210 determines whether the requested data is cached in cache memory. Specifically, cache controller 210 may access cache memory 220 and check if cached data includes the requested data. For example, cache controller 210 may access cache memory 220 and determine whether data points for the cached data include at least a subset of the duration of December 2024.

If cache controller 210 determines that cached data does not include any portion of the requested data, method 300 can proceed to step 325, which includes querying for data tables in database 230. For example, cache controller 210 may query for data tables stored in database 230 to retrieve the requested data (e.g., tickets issued in December 2024) to generate a response to query 206.

If cache controller 210 determines that cached data includes at least a portion of the requested data, method 300 proceeds to step 330, which includes determining whether the requested data is cached fully or partially. For example, cache controller 210 can determine data points requested in query 206 (e.g., a date range from December 1st to Dec. 31, 2024) and compare with cached data to see if at least a subset of data points requested in query 206 is cached in cache memory 220.

If cache controller 210 determines that the requested data is fully cached, method 300 can proceed to step 340, which includes accessing cached data from cache memory 220. For example, cache controller 210 may access and fetch entirely, from cache memory 220, cached data relating to tickets issued in December 2024.

If cache controller 210 determines that the requested data is not fully cached, method 300 proceeds to step 350, which includes querying database 230 for missing data points. For example, if cache controller 210 determines that cached data includes data points corresponding to weekdays (Monday-Friday) of December 2024, cache controller 210 can access database 230 to retrieve data points corresponding to weekends (Saturday and Sunday) of December 2024.

At step 355, cache controller 210 merges the newly retrieved data from database 230 with cached data. For example, cache controller 210 can stitch/combine the data retrieved from cache memory 220 (e.g., data points corresponding to weekdays of December 2024) and the data retrieved from database 230 (e.g., data points corresponding to weekends of December 2024). As described previously, without having to retrieve data newly and fully from database 230, the disclosed method 300 can reduce the time and compute resources and therefore, improve the caching mechanism by incrementally caching based on prior results.

FIG. 4 illustrates a flowchart of an example method 400 for dynamically accessing cached data based on a subset of data points associated with a query and partially retrieving data from a primary data source for the remaining data points. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIG. 2. However, method 400 is not limited to that example.

At step 410, method 400 includes receiving a user query. For example, cache controller 210 may receive user query (e.g., query 206), which includes a request for data associated with a time range comprising a plurality of data points indexed in time order (e.g., time-series data).

In some examples, cache controller 210 may rewrite query 206 when query 206 includes a plurality of conditions. For example, cache controller 210 determines that query 206 includes multiple logical conditions (e.g., AND, OR, etc.) and rewrite query 206 using a hashing code for the logical conditions. The hash code generator 212 can produce the same hash for different condition orders (e.g., A or B or C, A or C or B, B or A or C, B or C or B, C or A or B, or C or B or A). Generating the same hash codes for multiple logical conditions in different orders can provide technical advantages. Specifically, this can reduce query complexity and improve the query optimization by uniquely identifying conditions and rewriting them to be more efficient at caching since there is no need to generate a duplicate list.

At step 420, method 400 includes accessing cached data from a cache memory. For example, cache controller 210 may access cached data stored in a cache (e.g., cache memory 220) and identify cached data associated with query 206.

At step 430, method 400 includes retrieving, from the cache memory, a first set of data associated with a first subset of the plurality of data points. For example, cache controller 210 may retrieve, from cache memory 220, a first set of data associated with a first subset of the plurality of data points. As previously described, cache controller 210 can identify cached data that have at least a portion of data points specified in query 206. The use of partial data fetching based on cached results can provide technical advantages. Specifically, this can reduce the need for full-range queries in time-series analysis, and therefore, data retrieval can be efficiently performed with reduced usage of time and compute resources.

At step 440, method 400 includes accessing a database. For example, cache controller 210 may access database 230, which is configured to store time-series data, which comprises a sequence of data points that are associated with successive points in time (e.g., performance measurements from a computer system, incident resolution and closure, etc.).

At step 450, method 400 includes retrieving, from the database, a second set of data associated with a second subset of the plurality of data points. For example, cache controller 210 may retrieve, from database 230, a second set of data associated with a second subset of the plurality of data points. The second subset of the plurality of data points includes remaining data points that are distinct from the first subset of the plurality of data points. This partial data retrieval can provide numerous technical advantages. A subset of data points that are missing in a cache memory needs to be partially retrieved from the primary data source without having to precompute all values referenced in a query. As follows, the disclosed technology can optimize dynamic runtime queries where users can have the full flexibility of slicing and dicing.

In some examples, method 400 includes providing the set of data retrieved from database 230 to cache memory 220 for reuse and compute for the next set of values. For example, cache controller 210 can provide the data points fetched partially from database 230 to cache memory 220 to fill in the time range. Further, method 400 includes merging at least the portion of the cached data associated with the first subset of the plurality of data points and the set of data associated with the second subset of the plurality of data points. As follows, the cache controller 210 may generate a response to the user query (e.g., query 206) based on the merged data, which includes at least the portion of the cached data (e.g., the set of data retrieved from cache memory 220) and the set of data retrieved from database 230. This technique for merging cached data with real-time data can provide several technical advantages such as enabling efficient query results retrieval with reduced time and computational efforts, especially when dealing with a large volume of time-series datasets.

In some aspects, cached data may be reused for subsequent queries, and only the missing dates can be fetched from the data source (e.g., database 230), merging with the existing cache for faster and more efficient analytics. A method for incrementally caching aggregated query results for specific time series data points can provide technical advantages by allowing the reuse of cached results for subsequent queries with overlapping date ranges.

Figure 5:
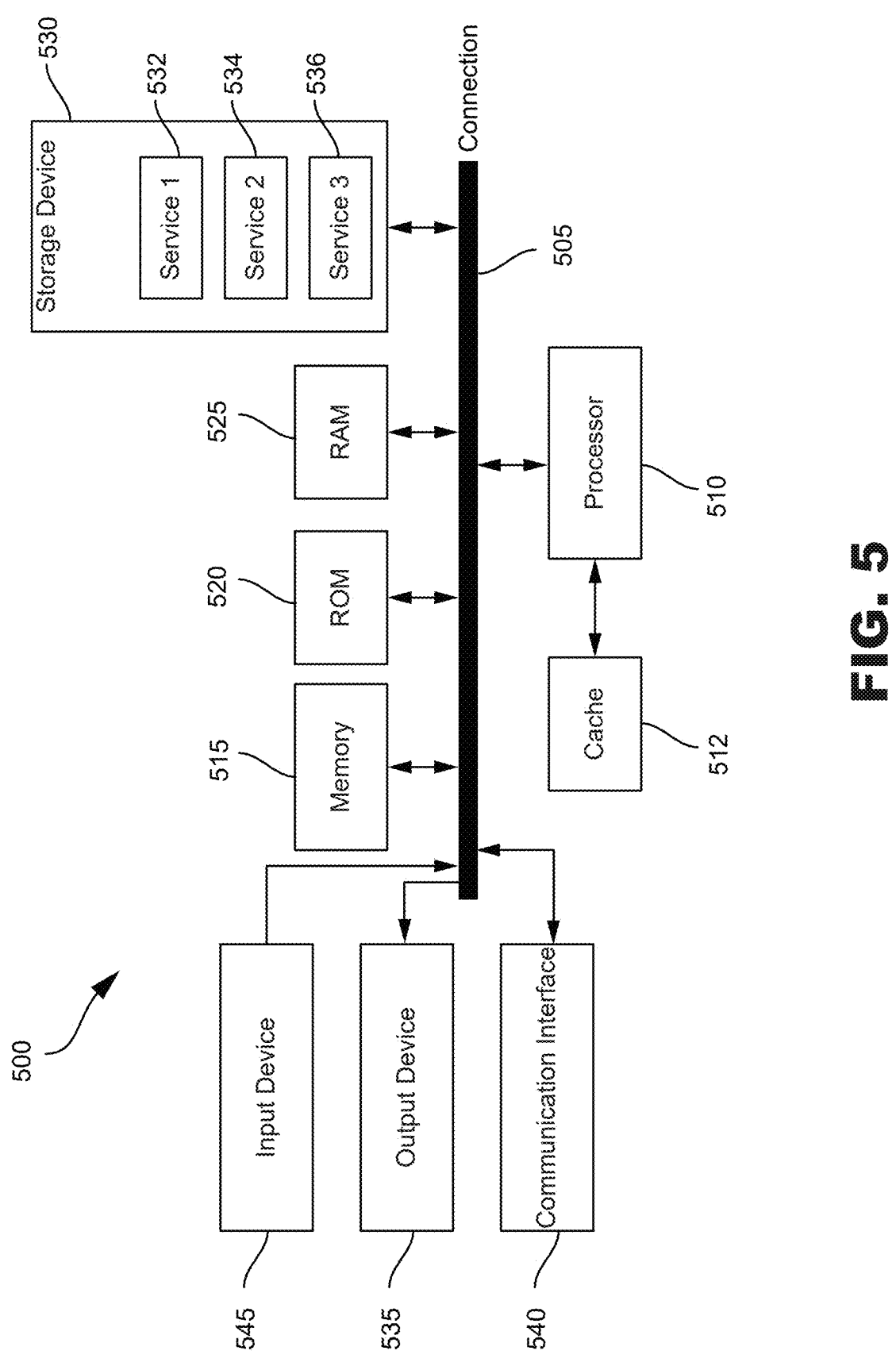
FIG. 5 illustrates an example processor-based system with which some aspects of the subject technology can be implemented, according to some examples of the present disclosure.

FIG. 5 illustrates an example processor-based system with which some aspects of the subject technology can be implemented. For example, processor-based system 500 can be any computing device making up cache controller 110, 210, any of the client devices 116, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some examples, computing system 500 is a distributed system in which the functions described in this disclosure can be distributed within a datacenter, multiple data centers, a peer network, etc. In some implementations, one or more of the described system components represents many such components each performing some or all of the function for which the component is described. In some embodiments, the components can be physical or virtual devices.

Example system 500 includes at least one processing unit (Central Processing Unit (CPU) or processor) 510 and connection 505 that couples various system components including system memory 515, such as Read-Only Memory (ROM) 520 and Random-Access Memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communication interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 502.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Program-mable ROM (PROM), Erasable PROM (EPROM), Electri-cally Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 530 can include software services, servers, services, etc., that when the code that defines such software is executed by the processor 510, it causes the system 500 to perform a function. In some embodiments, a hardware service that performs a particular function can include the software component stored in a computer-readable medium in connection with the necessary hardware components, such as processor 510, connection 505, output device 535, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another commu-nications connection (either hardwired, wireless, or combi-nation thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose com-puter, special purpose computer, or special purpose process-ing device to perform a certain function or group of func-tions. Computer-executable instructions also include program modules that are executed by computers in stand-alone or network environments. Generally, program mod-ules include routines, programs, components, data struc-tures, objects, and the functions inherent in the design of special-purpose processors, etc. that perform tasks or imple-ment abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of com-puter system configurations, including personal computers, hand-held devices, multi-processor systems, microproces-sor-based or programmable consumer electronics, network Personal Computers (PCs), minicomputers, mainframe com-puters, and the like. Embodiments may also be practiced in distributed computing environments where tasks are per-formed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure recit-ing "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the present disclosure include:

Aspect 1. A computer-implemented method comprising: receiving a user query, the user query requesting data associated with a time range comprising a plurality of data points indexed in time order; accessing cached data from a cache memory; retrieving, from the cache memory, a first set of data associated with a first subset of the plurality of data points; accessing a database; and retrieving, from the data-base, a second set of data associated with a second subset of the plurality of data points, wherein the second subset of the plurality of data points includes remaining data points that are distinct from the first subset of the plurality of data points.

Aspect 2. The computer-implemented method of Aspect 1, wherein the user query includes a plurality of conditions and the computer-implemented method further comprises rewriting the user query using a hashing code for the plurality of conditions.

Aspect 3. The computer-implemented method of Aspect 2, wherein rewriting the user query using the hashing code for the plurality of conditions comprises: assigning the hashing code based on an order of the plurality of conditions.

Aspect 4. The computer-implemented method of any of Aspects 1 to 3, further comprising: merging the first set of data associated with the first subset of the plurality of data points and the second set of data associated with the second subset of the plurality of data points.

Aspect 5. The computer-implemented method of Aspect 4, further comprising: generating a response to the user query based on merged data comprising the first set of data and the second set of data.

Aspect 6. The computer-implemented method of any of Aspects 1 to 5, further comprising: providing the second set of data retrieved from the database to the cache memory.

Aspect 7. The computer-implemented method of any of Aspects 1 to 6, further comprising: identifying temporal boundaries of the time range based on the user query; and identifying the plurality of data points within the temporal boundaries.

Aspect 8. A system comprising: one or more processors; and at least one computer-readable storage medium having stored therein instructions which, when executed by the one or more processors, cause the one or more processors to: receive a user query, the user query requesting data associated with a time range comprising a plurality of data points indexed in time order; access cached data from a cache memory; retrieve, from the cache memory, a first set of data associated with a first subset of the plurality of data points; access a database; and retrieve, from the database, a second set of data associated with a second subset of the plurality of data points, wherein the second subset of the plurality of data points includes remaining data points that are distinct from the first subset of the plurality of data points.

Aspect 9. The system of Aspect 8, wherein the user query includes a plurality of conditions and the instructions further cause the one or more processors to rewrite the user query using a hashing code for the plurality of conditions.

Aspect 10. The system of Aspect 9, wherein rewriting the user query using the hashing code for the plurality of conditions comprises: assigning the hashing code based on an order of the plurality of conditions.

Aspect 11. The system of any of Aspects 8 to 10, wherein the instructions further cause the one or more processors to: merge the first set of data associated with the first subset of the plurality of data points and the second set of data associated with the second subset of the plurality of data points.

Aspect 12. The system of Aspect 11, wherein the instructions further cause the one or more processors to: generate a response to the user query based on merged data comprising the first set of data and the second set of data.

Aspect 13. The system of any of Aspects 8 to 12, wherein the instructions further cause the one or more processors to: provide the second set of data retrieved from the database to the cache memory.

Aspect 14. The system of any of Aspects 8 to 13, wherein the instructions further cause the one or more processors to:

identify temporal boundaries of the time range based on the user query; and identify the plurality of data points within the temporal boundaries.

Aspect 15. A non-transitory computer-readable medium having stored thereon instructions which, when executed by one or more processors, cause the one or more processors to: receive a user query, the user query requesting data associated with a time range comprising a plurality of data points indexed in time order; access cached data from a cache memory; retrieve, from the cache memory, a first set of data associated with a first subset of the plurality of data points; access a database; and retrieve, from the database, a second set of data associated with a second subset of the plurality of data points, wherein the second subset of the plurality of data points includes remaining data points that are distinct from the first subset of the plurality of data points.

Aspect 16. The non-transitory computer-readable medium of Aspect 15, wherein the user query includes a plurality of conditions and the instructions further cause the one or more processors to rewrite the user query using a hashing code for the plurality of conditions.

Aspect 17. The non-transitory computer-readable medium of Aspect 16, wherein rewriting the user query using the hashing code for the plurality of conditions comprises: assigning the hashing code based on an order of the plurality of conditions.

Aspect 18. The non-transitory computer-readable medium of any of Aspects 15 to 17, wherein the instructions further cause the one or more processors to: merge the first set of data associated with the first subset of the plurality of data points and the second set of data associated with the second subset of the plurality of data points; and generate a response to the user query based on merged data comprising the first set of data and the second set of data.

Aspect 19. The non-transitory computer-readable medium of any of Aspects 15 to 18, wherein the instructions further cause the one or more processors to: provide the second set of data retrieved from the database to the cache memory.

Aspect 20. The non-transitory computer-readable medium of any of Aspects 15 to 19, wherein the instructions further cause the one or more processors to: identify temporal boundaries of the time range based on the user query; and identify the plurality of data points within the temporal boundaries.

What is claimed is:

1. A computer-implemented method comprising:

receiving a first user query, the first user query requesting data associated with a time range comprising a plurality of data points indexed in time order, wherein the first user query is associated with a first plurality of logical operators comprising a first operator followed by a second operator;

receiving a second user query associated with a second plurality of logical operators, wherein the second plurality of logical operators comprises the second operator followed by the first operator, wherein the second user query is different from the first user query;

rewriting the first user query using a hashing code, wherein the hashing code is assigned based on an order of the plurality of logical operators;

rewriting the second user query using the hashing code;

accessing cached data from a cache memory based on the rewritten first user query;

retrieving, from the cache memory and based on the rewritten first user query, a first set of data associated with a first subset of the plurality of data points that are indexed in time order;

accessing a database based on the rewritten second user query to retrieve a second set of data;

retrieving, from the database, the second set of data associated with a second subset of the plurality of data points, wherein the second subset of the plurality of data points includes remaining data points that are distinct from the first subset of the plurality of data points; and retrieving, from the cache memory and based on the rewritten second user query, a third set of data.

2. The computer-implemented method of claim 1, further comprising: merging the first set of data associated with the first subset of the plurality of data points and the second set of data associated with the second subset of the plurality of data points.

3. The computer-implemented method of claim 2, further comprising:

generating a response to the first user query based on merged data comprising the first set of data and the second set of data; and generating a response to the second query based on the third set of data.

4. The computer-implemented method of claim 1, further comprising:

providing the second set of data retrieved from the database to the cache memory.

5. The computer-implemented method of claim 1, further comprising:

identifying temporal boundaries of the time range based on the first user query;

and identifying the plurality of data points within the temporal boundaries.

6. A system comprising:

one or more processors; and at least one computer-readable storage medium having stored therein instructions which, when executed by the one or more processors, cause the one or more processors to:

receive a first user query, the first user query requesting data associated with a time range comprising a plurality of data points indexed in time order, wherein the first user query is associated with a first plurality of logical operators comprising a first operator followed by a second operator;

receive a second user query associated with a second plurality of logical operators, wherein the second plurality of logical operators comprises the second operator followed by the first operator, wherein the second user query is different from the first user query;

rewrite the first user query using a hashing code, wherein the hashing code is assigned based on an order of the plurality of logical operators;

rewrite the second user query using the hashing code;

access cached data from a cache memory based on the rewritten first user query;

retrieve, from the cache memory and based on the rewritten first user query, a first set of data associated with a first subset of the plurality of data points that are indexed in time order;

access a database based on the rewritten second user query to retrieve a second set of data;

retrieve, from the database, the second set of data associated with a second subset of the plurality of data points, wherein the second subset of the plurality of data points includes remaining data points that are distinct from the first subset of the plurality of data points; and

retrieve, from the cache memory and based on the rewritten second user query, a third set of data.

7. The system of claim 6, wherein the instructions further cause the one or more processors to:

merge the first set of data associated with the first subset of the plurality of data points and the second set of data associated with the second subset of the plurality of data points.

8. The system of claim 7, wherein the instructions further cause the one or more processors to:

generate a response to the first user query based on merged data comprising the first set of data and the second set of data; and generate a response to the second query based on the third set of data.

9. The system of claim 6, wherein the instructions further cause the one or more processors to:

provide the second set of data retrieved from the database to the cache memory.

10. The system of claim 6, wherein the instructions further cause the one or more processors to:

identify temporal boundaries of the time range based on the first user query; and identify the plurality of data points within the temporal boundaries.

11. A non-transitory computer-readable medium having stored thereon instructions which, when executed by one or more processors, cause the one or more processors to:

receive a first user query, the first user query requesting data associated with a time range comprising a plurality of data points indexed in time order, wherein the first user query is associated with a first plurality of logical operators comprising a first operator followed by a second operator;

receive a second user query associated with a second plurality of logical operators, wherein the second plurality of logical operators comprises the second operator followed by the first operator, wherein the second user query is different from the first user query;

rewrite the first user query using a hashing code, wherein the hashing code is assigned based on an order of the plurality of logical operators;

rewrite the second user query using the hashing code;

access cached data from a cache memory based on the rewritten first user query;

retrieve, from the cache memory and based on the rewritten first user query, a first set of data associated with a first subset of the plurality of data points that are indexed in time order;

access a database based on the rewritten second user query to retrieve a second set of data; and retrieve, from the database, the second set of data associated with a second subset of the plurality of data points, wherein the second subset of the plurality of data points includes remaining data points that are distinct from the first subset of the plurality of data points; and retrieve, from the cache memory and based on the rewritten second user query, a third set of data.

12. The non-transitory computer-readable medium of claim 11, wherein the instructions further cause the one or more processors to:

merge the first set of data associated with the first subset of the plurality of data points and the second set of data associated with the second subset of the plurality of data points; and generate a response to the user query based on merged data comprising the first set of data and the second set of data.

13. The non-transitory computer-readable medium of claim 11, wherein the instructions further cause the one or more processors to:

provide the second set of data retrieved from the database to the cache memory.

14. The non-transitory computer-readable medium of claim 11, wherein the instructions further cause the one or more processors to:

identify temporal boundaries of the time range based on the first user query; and identify the plurality of data points within the temporal boundaries.

* * * * *